United States Patent
Chiang et al.

(10) Patent No.: US 6,954,816 B2
(45) Date of Patent: Oct. 11, 2005

(54) PERIPHERAL DEVICE WITH SHARED BUS INTERFACE AND OPERATING METHOD THEREOF

(75) Inventors: Wei-Ren Chiang, Nantou (TW); Cheng Te Lin, Douliou (TW); Jen-Che Tsai, Kaohsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 348 days.

(21) Appl. No.: 10/141,851

(22) Filed: May 10, 2002

(65) Prior Publication Data

US 2002/0169917 A1 Nov. 14, 2002

(30) Foreign Application Priority Data

May 11, 2001 (TW) .................................... 90111288 A

(51) Int. Cl.[7] .................... G06F 13/38; G06F 13/42; G06F 13/36
(52) U.S. Cl. ............................ 710/305; 710/105
(58) Field of Search ............................ 710/105, 110, 710/107, 305, 306, 311, 313, 314; 711/167

(56) References Cited

U.S. PATENT DOCUMENTS

| | | | | | |
|---|---|---|---|---|---|
| 4,247,740 A | * | 1/1981 | Anderson et al. | ........... | 379/124 |
| 5,006,976 A | * | 4/1991 | Jundt | ........... | 700/79 |
| 5,805,843 A | * | 9/1998 | Gehlhaar | ........... | 710/305 |
| 5,878,237 A | * | 3/1999 | Olarig | ........... | 710/309 |
| 6,067,590 A | * | 5/2000 | Pettey et al. | ........... | 710/100 |
| 6,230,225 B1 | * | 5/2001 | Olarig et al. | ........... | 710/306 |
| 6,449,677 B1 | * | 9/2002 | Olarig et al. | ........... | 710/305 |
| 6,631,437 B1 | * | 10/2003 | Callison et al. | ........... | 710/313 |
| 6,662,251 B2 | * | 12/2003 | Brock et al. | ........... | 710/110 |

FOREIGN PATENT DOCUMENTS

GB     2201533 A  *  9/1988  ........... G06F/3/153

OTHER PUBLICATIONS

PCI Special Interest Group, "PCI Local Bus Specification", Dec. 18, 1998, Revision 2.2.*

* cited by examiner

*Primary Examiner*—Paul R. Myers
*Assistant Examiner*—Ryan M. Stiglic
(74) *Attorney, Agent, or Firm*—Rabin & Berdo, P.C.

(57) ABSTRACT

A peripheral device for use in a system including a storage unit coupled to a local bus. The peripheral device has a shared bus interface provided for interfacing with the storage unit and the local bus. The peripheral device also includes core logic coupled to the shared bus interface. When the core logic receives a read/write command with respect to the storage unit through the local bus, it causes the local bus to enter at least a wait state and performs a corresponding data transfer between the peripheral device and the storage unit through the shared bus interface during the wait state. In particular, the peripheral device shares the shared bus interface with the storage unit so as to transfer data.

19 Claims, 6 Drawing Sheets

PERIPHERAL DEVICE WITH SHARED BUS INTERFACE AND OPERATING METHOD THEREOF

FIELD OF THE INVENTION

The present invention relates generally to a PCI device sharing its interface with an expansion memory and, in particular, to a PCI device having an enhanced PCI interface for sharing the address/data bus of the PCI bus with the address, data and control signals of an expansion memory.

BACKGROUND OF THE INVENTION

Many computer systems include one or more local buses, or expansion buses, to couple system elements together and enable the transfer of data between the system elements. An example of such an expansion bus is the popular Peripheral Component Interconnect (PCI) bus. It is a 32- or 64-bit bus with multiplexed address, data and control lines. The specification for the PCI bus is set forth in the document PCI Local Bus Specification, Production Version Revision 2.1, or newer. Among the many features which the PCI specification provides is the use of an "Expansion ROM". The Expansion ROM is a non-volatile memory device residing on a PCI system or a PCI add-in, expansion board. At a minimum, the Expansion ROM must contain initialization code that will be called by the power-on self-test to initialize the PCI system to a known state. In addition, if the PCI system will be used during the boot process, the boot code must be implemented in the Expansion ROM.

The typical way in which the Expansion ROM is used is defined in the PCI Local Bus Specification, so it will not be further described herein. In the example of an Ethernet add-in board (Network Interface Card, NIC) supporting remote booting services, diskless computers or workstations equipped with the Ethernet NIC are enabled to boot from any servers on the Ethernet network. An Expansion ROM on the add-in board must be implemented to work with a PCI device for Ethernet control, which allows booting of the diskless workstations. Instead of loading the operating system from a local hard drive or floppy disk, the boot routine in the Expansion ROM issues a request over the network to have a server send a copy of the operating system. As the boot routine receives the operating system code, it loads the operating system into the local workstation's main memory and passes control to the operating system when complete. The Expansion ROM on the NIC, such as a flash memory containing the initialization code and the boot routine, is often referred to as a "BootROM".

Conventional PCI devices are provided with a separate memory interface to connect memory devices as shown in FIG. 1. The PCI device 11 includes a PCI bus interface 113 for connecting to the PCI bus 15. In addition, a memory interface 111 couples the PCI device 11 to the Expansion ROM 13. If the Expansion ROM 13 is an 8-bit flash memory of 128 kilobytes, the minimum number of signals in the memory interface 111 is 28 in which the memory interface 111 must include 8 data signals, 17 address signals, and 3 control signals: write enable, output enable and chip enable. The PCI device 11 is an Ethernet control chip for example, and it will require some pins for the PCI interface, some pins for the network interface, and 28 more pins for the memory interface. The more pins included in an integrated circuit chip, the greater its package size. However, the cost of an IC chip goes up as the package size is increased.

Therefore, what is needed is a solution for lowering the cost of the IC chip by reducing the number of required pins.

SUMMARY OF THE INVENTION

It is an object of the present invention to provide a mechanism for a PCI device sharing the address/data bus of the PCI bus with an expansion memory.

The present invention discloses a peripheral device for use in a system including a storage unit coupled to a local bus. In accordance with one aspect of the invention, the peripheral device includes a shared bus interface for interfacing with the storage unit and the local bus. The peripheral device also includes core logic coupled to the shared bus interface. The core logic is used to cause the local bus to enter at least a wait state when receiving, through the local bus, a read/write command with respect to the storage unit. Meanwhile, it performs a corresponding data transfer between the peripheral device and the storage unit through the shared bus interface during the wait state.

According to the invention, the shared bus interface is an enhanced PCI interface including a PCI bus interface configured to interface with the local bus correspondingly. Moreover, the storage unit serves as the PCI expansion memory containing the initialization code and the boot routine. The address, data, write enable, and output enable signals of the storage unit are connected to a time-multiplexed address/data bus of the PCI bus interface, such that the peripheral device and the storage unit share the enhanced PCI interface to transfer data. Further, the enhanced PCI interface includes a chip enable signal independent of the PCI bus interface to avoid bus contention.

In another aspect of the invention, a method for transferring data to/from an expansion memory through a shared bus interface during wait states is disclosed. The shared bus interface is configured to interface with a PCI bus and the expansion memory storing the initialization code and boot routine. At first a command is received through the PCI bus. Then, the type of the received command is determined. If the received command is a write command with respect to the expansion memory, a PCI write transaction to buffer the data to be used to update the expansion memory is performed. Subsequently, a read command with respect to the expansion memory is received right after the write command. The PCI bus is therefore caused to enter one or more wait states so as to proceed to an expansion memory write transaction. When the expansion memory write transaction is in progress, the expansion memory is updated with the previously buffered data through the share bus interface during the wait states.

Otherwise, if the received command is a read command with respect to the expansion memory and it does not immediately follow the write command, the PCI bus is caused to enter one or more wait states so as to proceed to an expansion memory read transaction. When the expansion memory read transaction is in progress, the data driven onto the share bus interface by the expansion memory is thus read and buffered during the wait states. After completion of the expansion memory read/write transaction, the PCI bus is caused to exit from the wait states. Note that the write enable signal or the output enable signal of the expansion memory is asserted through the shared bus interface during the wait states depending on the transaction type.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
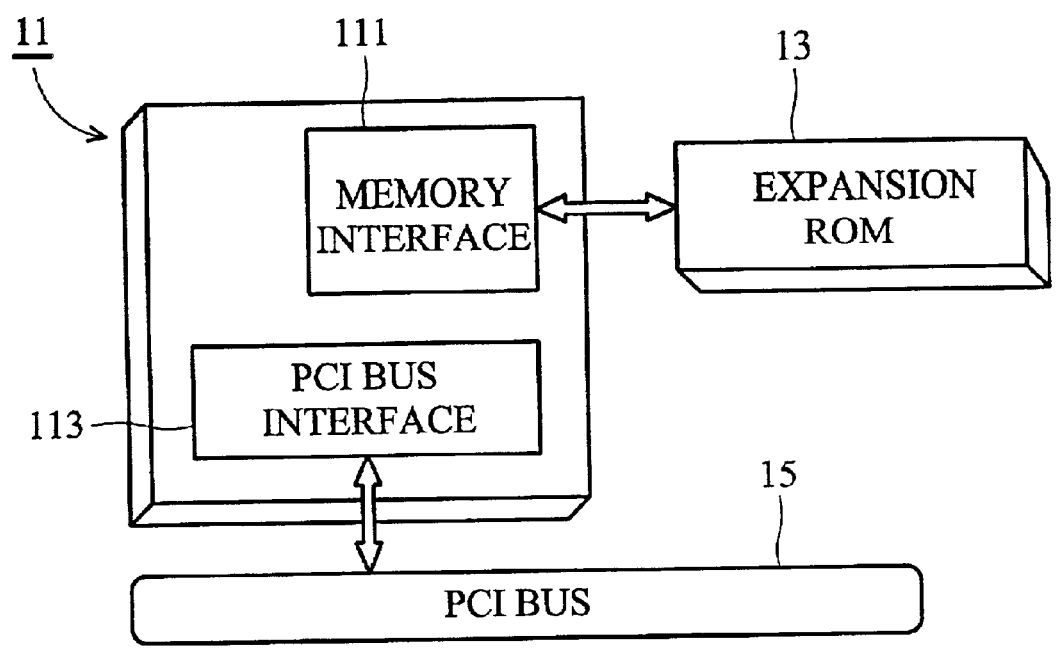
FIG. 1 is a block diagram of a PCI device working with an expansion memory according to the prior art.
Figure 2:
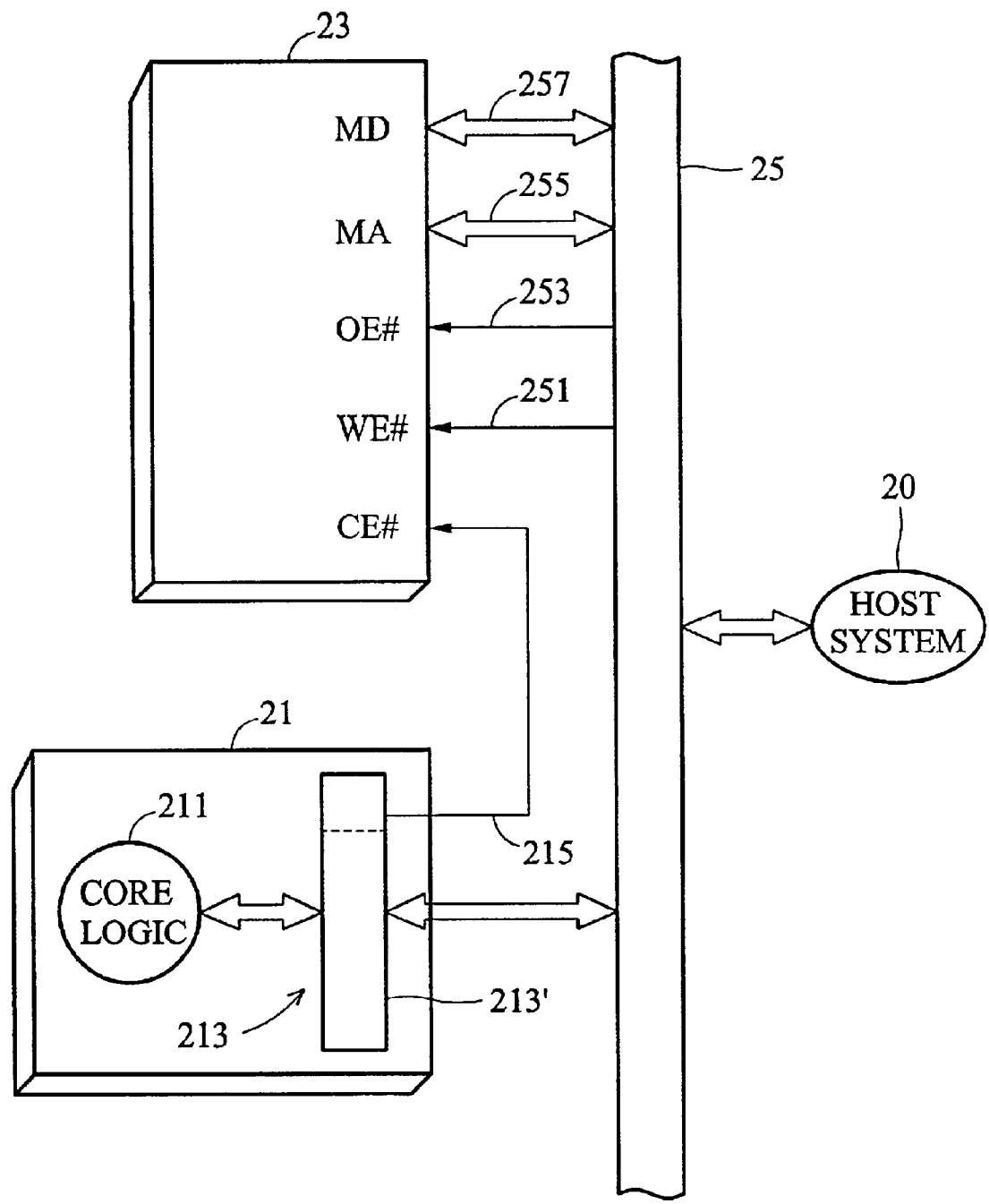
FIG. 2 is a block diagram of a PCI device having an enhanced PCI interface for interfacing with the PCI bus and an expansion memory according to the invention.

Referring to FIG. 2, a peripheral device 21 includes a shared bus interface 213 for interfacing with a storage unit 23 and a local bus 25. The peripheral device 21 also includes core logic 211 coupled to the shared bus interface 213. The core logic 211 is used to cause the local bus 25 to enter at least a wait state when it receives a read/write command with respect to the storage unit 23 through the local bus 25. Meanwhile, the core logic 211 performs a corresponding data transfer between the peripheral device 21 and the storage unit 23 through the shared bus interface 213 during the wait state of the local bus 25 according to the invention.

In one embodiment, the local bus 25 is a PCI bus conforming to the PCI 2.1 specification or newer. The PCI specification defines a clock CLK, a time-multiplexed address/data bus AD, command/byte enable signals C/BE#, and interface control signals. The control signals include a cycle frame signal FRAME#, an initiator ready signal IRDY# and a target ready signal TRDY#. Active low signals are denoted with a # at the end of the signal name hereinafter. A wait state defined by the PCI specification is a bus clock in which no transfer occurs. When either IRDY# or TRDY# is deasserted the PCI bus is said to be in the wait state. As such, the shared bus interface 213 is called an "enhanced PCI interface" which includes a PCI bus interface 213' configured to interface with the PCI bus 25 correspondingly. In FIG. 2, a host system 20 is also coupled to the PCI bus 25 to communicate with the PCI device 21. The present invention contemplates employing other local buses having similar characteristics as the PCI bus.

The peripheral device 21 is representative of a PCI device. An example of such a PCI device is an Ethernet controller. Moreover, the storage unit 23 serves as the PCI expansion memory containing the initialization code and the boot routine. Examples of the storage unit 23 are flash memory, EPROM (Erasable Programmable Read Only Memory) and RAM (Random Access Memory). An address bus MA, a data bus MD, a write enable signal WE#, and an output enable signal OE# of the expansion memory 23 are coupled to the AD bus of the PCI bus 25 via lines 251~257 in FIG. 2. Further, a chip enable signal CE# of the expansion memory 23 is coupled to the enhanced PCI interface 213 through a line 215. That is, the enhanced PCI interface 213 includes the chip enable line 215 independent of the PCI bus interface 213' to avoid bus contention. Therefore, the PCI device 21 and the expansion memory 23 share the enhanced PCI interface 213 to transfer data. Preferably, the PCI device 21 includes one or more read/write registers (not shown) for buffering the data to be transferred.

Figure 3:
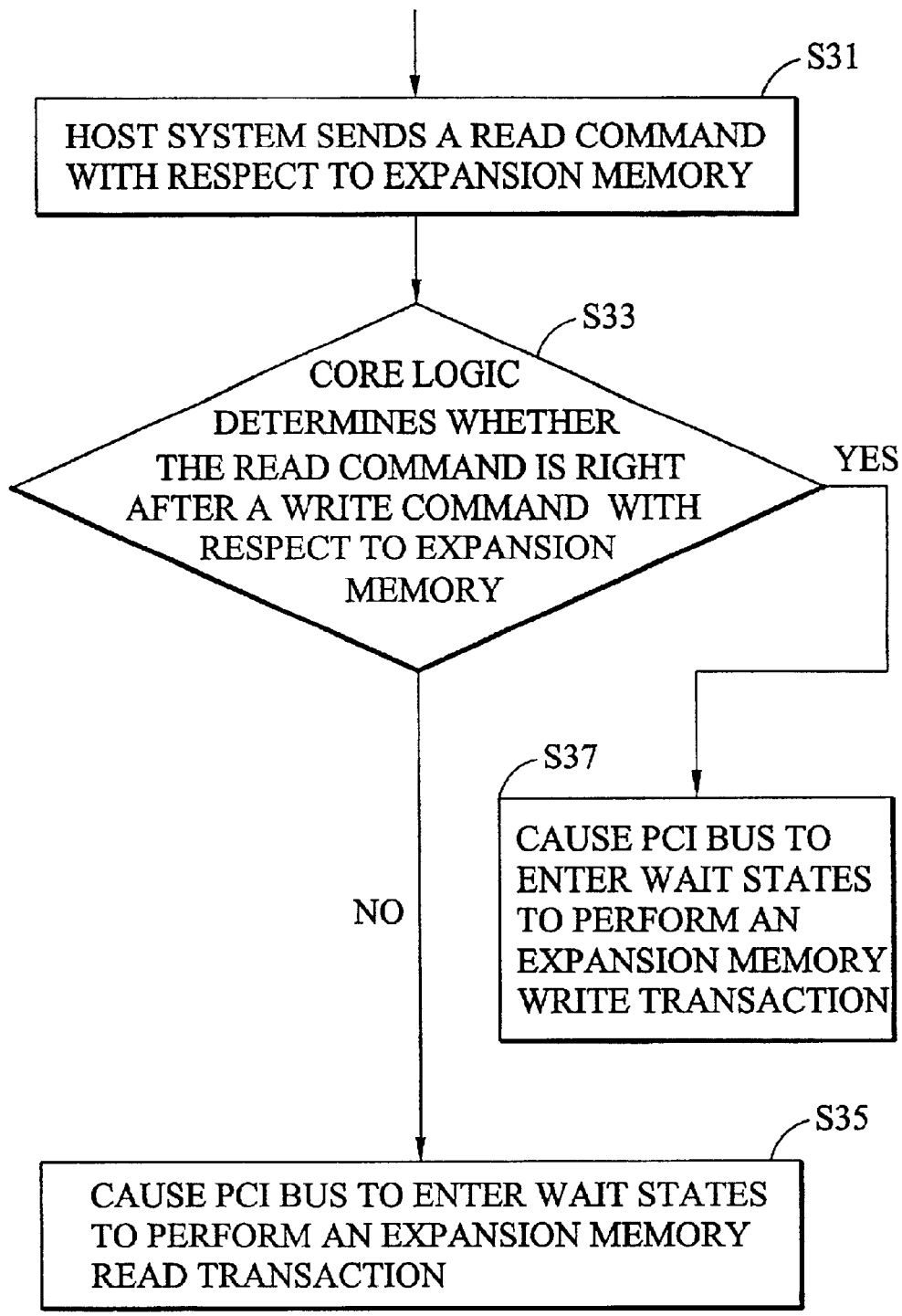
FIG. 3 is a flowchart illustrating the expansion memory read operation according to the invention.
Figure 4:
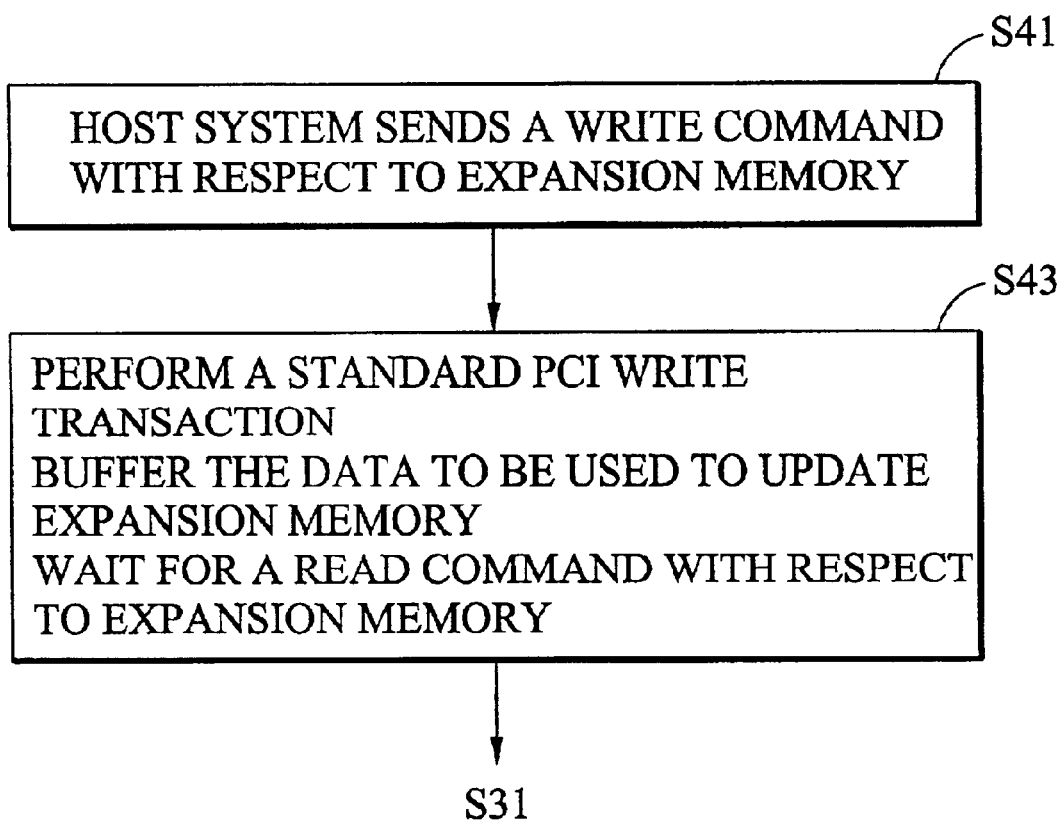
FIG. 4 is a flowchart illustrating the expansion memory write operation according to the invention.

The data transfers between the PCI device 21 and the expansion memory 23 will be explained from the preferred embodiment of FIG. 2 in conjunction with the accompanying flowcharts of FIGS. 3~4. At first, the host system 20 sends a command to the PCI device 21. The PCI device 21 receives the command through the PCI bus 25. The core logic 211 of the PCI device 21 determines the type of command received. Assuming that the host system 20 sends a read command with respect to the expansion memory 23 (step S31 in FIG. 3). The core logic 211 then determines whether the read command is right after a write command with respect to the expansion memory 23 (step S33). If so, it proceeds to step S37 which will be described below. Alternatively, if the read command does not immediately follow a write command, the core logic 211 causes the PCI bus 25 to enter one or more wait states so as to proceed to an expansion memory read transaction (step S35). When the expansion memory read transaction is in progress, the expansion memory drives its data onto the AD bus of the PCI bus 25 and the PCI device 21 read the data through the enhanced PCI interface 213 during the wait states. On the other hand, assuming that the host system 20 sends a write command with respect to the expansion memory 23 (step S41 in FIG. 4). The core logic 211 performs a standard PCI write transaction to buffer the data to be used to update the expansion memory 23 and then waits for the following read command (step S43). Subsequently, the host system 20 sends a read command with respect to the expansion memory 23, and next it proceeds to step S31 of FIG. 3. Accordingly, the core logic 211 causes the PCI bus 25 to enter one or more wait states so as to proceed to an expansion memory write transaction (step S37). When the expansion memory write transaction is in progress, the expansion memory 23 is updated with the previously buffered data through the PCI bus 25 by way of the enhanced PCI interface 213 during the wait states.

When the standard PCI write transaction is in progress, the host system 20 may still drive the AD bus during the wait states. Since it cannot hand off control of the AD bus to the PCI device 21, as it does during a read transaction, a read command following a write is necessary for the host system 20 to stop driving the AD bus. Hence, the PCI device 21 of the invention can avoid bus contention thereby advantageously utilizing the PCI bus wait states to transfer data to/from the expansion memory 23.

Figure 5:
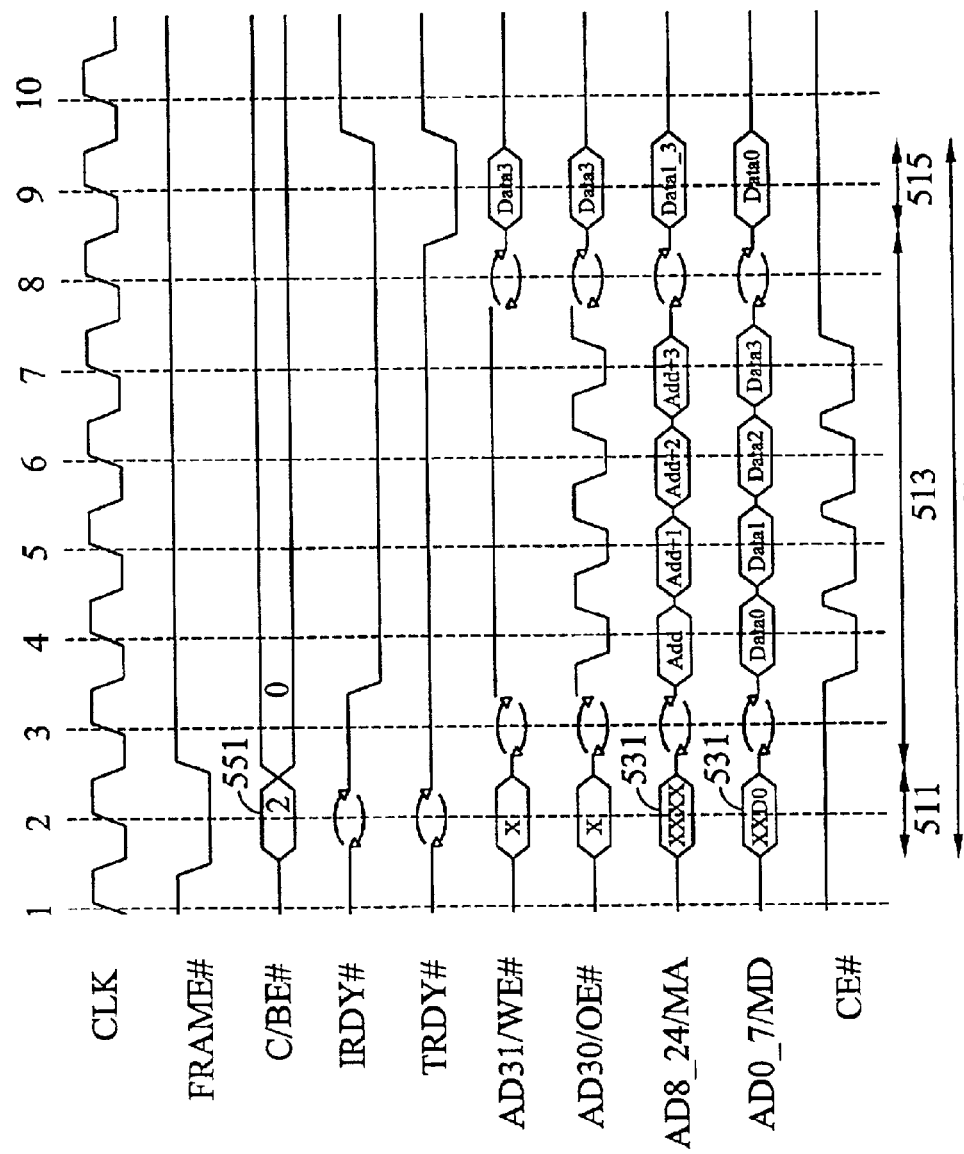
FIG. 5 is a timing diagram illustrating the enhanced PCI read transaction according to the invention.
Figure 6:
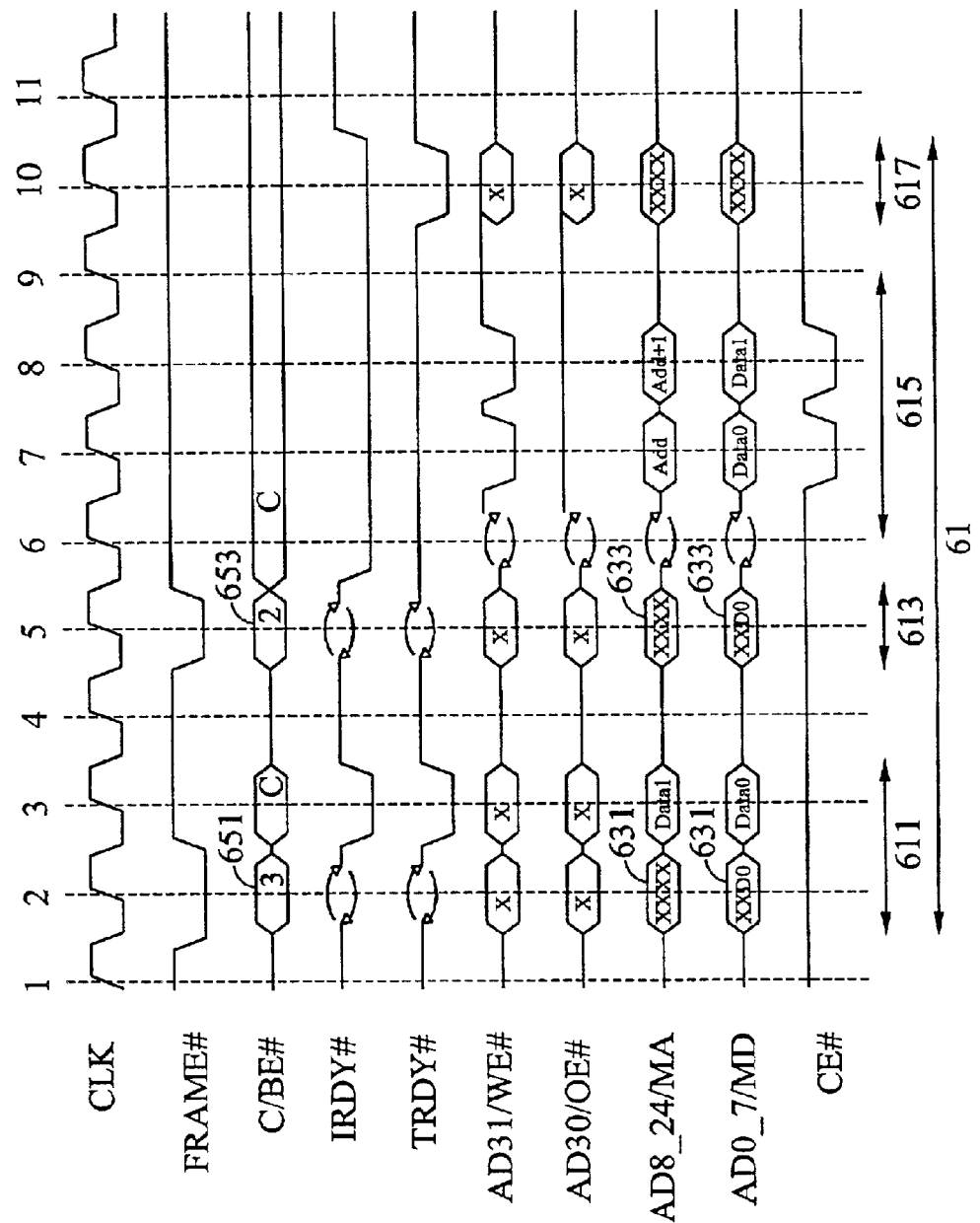
FIG. 6 is a timing diagram illustrating the enhanced PCI write transaction according to the invention.

FIGS. 5~6 are timing diagrams illustrating the invention. Those skilled in art can refer to the PCI specification for detailed description of the standard PCI bus transactions which occur in FIGS. 5 and 6. The signals are sampled on the rising edge of CLK. Each rising CLK edge is denoted by a vertical dotted line. The bus turnaround cycles required by the PCI specification are indicated by two arrows pointing at each other's tails. Each clock cycle is numbered for easy reference and begins and ends on the rising edge. As an example, the local bus 25 is a 32-bit PCI bus and the expansion memory is an 8-bit flash memory of 128 kilobytes. The 8-bit data bus MD[7:0] of the flash memory 23 is coupled to AD[7:0] of the PCI bus 25, and the 17-bit address bus MA[16:0] of the flash memory 23 is coupled to AD[24:8] of the PCI bus 25. The write and output enable signals WE# and OE# of the flash memory 23 are coupled to AD31 and AD30 of the PCI bus 25, respectively. Also, the chip enable signal CE# of the flash memory 23 is coupled to the enhanced PCI interface 213 through the line 215 in FIG. 2. The PCI device 21 is an agent mapped in I/O Address Space and includes a read/write register located at hexadecimal address 0×D0 for data buffering.

Referring now to FIG. 5, a timing diagram illustrating the enhanced PCI read transaction 51 of the invention is shown. At start of CLK 1, the host system asserts FRAME# to indicate that the transaction has begun. The enhanced PCI read transaction 51 starts with an address phase 511. The host system 20 drives a valid address onto AD bus and a valid bus command onto C/BE# lines at the same time.

At CLK 2, the PCI device 21 latches and decodes the address 531 and bus command 551. During the address phase 511, the bus command 551 of 0x02 indicates the I/O read command in progress. The decoded address 531 includes an offset equal to 0xD0. Therefore, the PCI device 21 is an addressed target and it needs to transfer data from the expansion memory 23. The host system 20 changes the information it is presenting on the C/BE# lines at the start of CLK 2. They now indicate which byte lanes are involved during the data transfer.

At CLK 3, it proceeds to the expansion memory read transaction 513. A turnaround cycle is required because ownership of the AD bus is changing hands. This period is required to avoid contention.

At CLK 4, the host system 20 has asserted the IRDY# to indicate that it is ready to receive the data item from the PCI device 21. The PCI device 21 still deasserts the TRDY# to cause the PCI bus to enter one or more wait states since it wishes to read data from the expansion memory 23 during the wait states. The core logic 211 drives the start address Add onto the AD[24:8] (MA[16:0]). It also drives the AD30 (OE#) and the line 215 (CE#) to a low level. The expansion memory 23 drives the first byte Data0 requested onto the MD[7:0] (AD[7:0]). The PCI device 21 latches the Data0 from the AD[7:0] when the OE# and CE# both are active, and the Data0 is then buffered at the register 0xD0.

At CLK 5, CLK 6 and CLK 7, the core logic 211 continues to deassert the TRDY#. As long as the TRDY# is deasserted, the expansion memory read transaction 513 may continue during successive clock cycles, since the C/BE# lines indicate that there are 4 data bytes to be transferred in this transaction. The PCI device 21 latches and buffers the second, third and fourth bytes Data1~Data3 as described in CLK 4.

At CLK 8, another turnaround cycle occurs. The PCI device 21 completes the expansion memory read transaction 513 at the same time.

At CLK 9, the PCI device 21 has asserted the TRDY# to cause the PCI bus 25 to exit from the wait states. The enhanced PCI read transaction 51 starts with a data phase 515. The PCI device 21 drives the 32-bit buffered data that is fetched from the expansion memory 23 onto the AD[31:0]. The buffered data is transferred from the bus to the host system 20 when both IRDY# and TRDY# are asserted on the same rising clock edge.

At CLK 10, the overall enhanced PCI read transaction 51 consisting of the expansion memory read transaction 513 has been completed. The host system 20 deasserts the IRDY# and the PCI device 21 deasserts the TRDY#.

Referring now to FIG. 6, a timing diagram illustrating the enhanced PCI write transaction 61 of the invention is shown. At start of CLK 1, the host system asserts FRAME# to indicate that a standard PCI write transaction 611 has begun. During CLK 2 and CLK 3, the host system 20 writes a word (2-byte) to the PCI device 21 according to an address 631 of 0xD0 and a bus command 651 of 0x03. The PCI device buffers the 2-byte data in the register 0xD0 and waits for the following read command.

At start of CLK 4, the host system asserts FRAME# again. The host system 20 drives a valid address onto AD bus and a valid bus command onto C/BE# lines during an address phase 613.

At CLK 5, the PCI device 21 latches and decodes the address 633 and bus command 653. During the address phase 613, the bus command 653 of 0x02 indicates the I/O read command is in progress. The decoded address 633 includes an offset equal to 0xD0. Thus, the PCI device 21 is an addressed target and it is required to transfer the buffered data to the expansion memory 23. The host system 20 changes the information it is presenting on the C/BE# lines at the start of CLK 5. They now indicate which byte lanes are involved during the data transfer.

At CLK 6, a turnaround cycle occurs and it proceeds to the expansion memory write transaction 615.

At CLK 7, the host system 20 has asserted the IRDY#. The PCI device 21 still deasserts the TRDY# to cause the PCI bus to enter one or more wait states since it wishes to perform data transfer. The core logic 211 drives the start address Add and the first byte Data0 of the previously buffered data onto the AD[24:8] (MA[16:0]) and the MD[7:0] (AD[7:0]) respectively. It also drives the AD31 (WE#) and the line 215 (CE#) to a low level. The expansion memory 23 latches and accepts the Data0 from the AD[7:0] when the WE# and CE# both are active.

At CLK 8, the core logic 211 continues to deassert the TRDY#. The expansion memory write transaction 615 may continue during successive clock cycles as long as the TRDY# is deasserted, since the C/BE# lines indicate that there are 2 data bytes to be transferred in this transaction. The PCI device 21 transfers the second byte Data1 of the previously buffered data to the expansion memory 23 as described in CLK 7.

At CLK 9, the PCI device 21 completes the expansion memory write transaction 615.

At CLK 10, the PCI device 21 has asserted the TRDY# to cause the PCI bus 25 to exit from the wait states and starts with a data phase 617. Any data transfer can be ignored during the data phase 617.

At CLK 11, the overall enhanced PCI write transaction 61 consisting of the standard PCI write and the expansion memory write transactions 611, 615 has been completed. The host system 20 deasserts the IRDY# and the PCI device 21 deasserts the TRDY#.

Accordingly, the present invention advantageously utilizes bus wait cycles to transfer data between a PCI device and its expansion memory thus accomplishing a shared bus interface, e.g., the enhanced PCI interface. With the enhanced PCI interface of the invention, for example, a PCI device may reduce 27 pins for memory interface if it works with an 8-bit flash memory of 128 kilobytes as the expansion memory.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A peripheral device for use in a system including a storage unit coupled to a local bus, comprising:
   a shared bus interface, coupled to the local bus, for interfacing with the storage unit and a host system through the local bus; and
   core logic, coupled to the shared bus interface, for causing the local bus to enter at least a nominal wait state when receiving, through the local bus, a read/write command with respect to the storage unit, and performing a corresponding data transfer between the peripheral device and the storage unit through the shared bus interface during the nominal wait state;

wherein the shared bus interface is an enhanced PCI interface comprising a PCI bus interface compliant with the Peripheral Component Interconnect (PCI) specification, in which the PCI bus interface is configured to interface with the local bus correspondingly; and wherein the core logic deasserts a target ready signal of the PCI bus interface to cause the local bus to enter the wait state.

2. The peripheral device of claim 1, wherein the storage unit has its write enable signal, its output enable signal, its plurality of address lines and its plurality of data lines connected to a time-multiplexed address/data bus of the PCI bus interface, whereby the peripheral device and the storage unit share the enhanced PCI interface to transfer data.

3. The peripheral device of claim 2 wherein the enhanced PCI interface further comprises a chip enable signal independent of the PCI bus interface to avoid bus contention.

4. The peripheral device of claim 3 wherein the core logic asserts the write enable, the output enable and the chip enable signals, depending on the received read/write command, to the store unit when performing the data transfer through the enhanced PCI interface during the nominal wait state.

5. A method for transferring data to an expansion memory through a shared bus interface during wait states, in which the shared bus interface is configured to interface with a local bus and the expansion memory storing data, the method comprising the steps of:

receiving a command through the local bus;

determining the type of command received;

if the received command is a write command with respect to the expansion memory, then performing the steps of:

performing a write transaction to buffer the data to be used to update the expansion memory;

receiving a read command with respect to the expansion memory right after the write command;

causing the local bus to enter one or more wait states; and transferring the previously buffered data to the expansion memory through the shared bus interface during the nominal wait states.

6. The method of claim 5 further comprising the step of causing the local bus to exit from the nominal wait states.

7. The method of claim 6 wherein the step of receiving the command through the local bus further comprises:

decoding an address of the local bus assigned to buffer the data, in which the address is driven onto the local bus during a first address phase; and decoding types of the received command during the first address phase.

8. The method of claim 7 wherein the step of receiving the read command with respect to the expansion memory right after the write command, further comprises:

decoding the address of the local bus assigned to the buffered data to be used to update the expansion memory, in which the address is driven onto the local bus during a second address phase.

9. The method of claim 8 wherein the step of causing the local bus to enter one or more nominal wait states comprises:

deasserting a target ready signal of the local bus so as to enforce the local bus to enter the nominal wait states; and proceeding to an expansion memory write transaction.

10. The method of claim 9 wherein the step of transferring the previously stored data comprises:

driving an expansion memory address onto a first portion of a time-multiplexed address/data bus of the local bus during the expansion memory write transaction;

writing the previously buffered data to the expansion memory through a second portion of the time-multiplexed address/data bus of the local bus as a write enable signal of the expansion memory is asserted; and asserting a chip enable signal of the expansion memory through the shared bus interface while writing the previously buffered data to the expansion memory;

wherein the first portion of the time-multiplexed address/data bus is connected to a plurality of memory address lines of the expansion memory correspondingly;

wherein the second portion of the time-multiplexed address/data bus is connected to a plurality of memory data lines of the expansion memory correspondingly;

wherein a third signal of the time-multiplexed address/data bus is coupled to the write enable signal of the expansion memory;

wherein the chip enable signal is independent of the local bus to avoid bus contention.

11. The method of claim 10 wherein the step of causing the local bus to exit from the nominal wait states is to assert the target ready signal of the local bus in order to complete expansion memory write transaction.

12. A method for transferring data from an expansion memory through a shared bus interface during wait states, in which the shared bus interface is configured to interface with a local bus and the expansion memory storing data, the method comprising the steps of:

receiving a command through the local bus;

determining the type of command received;

if the received command is a read command with respect to the expansion memory, then performing the steps of:

causing the local bus to enter one or more wait states; and reading and buffering the data which is driven onto the share bus interface by the expansion memory during the nominal wait states.

13. The method of claim 12 further comprising the step of causing the local bus to exit from the nominal wait states.

14. The method of claim 13 wherein the step of receiving the command through the local bus further comprises:

decoding an address of the local bus assigned to buffer the data, in which the address is driven onto the local bus during an address phase; and decoding types of the received command during the address phase.

15. The method of claim 14 wherein the step of causing the PCI bus to enter one or more nominal wait states comprises:

deasserting a target ready signal of the local bus so as to force the local bus to enter the nominal wait states; and proceeding to an expansion memory read transaction.

16. The method of claim 15 wherein the step of reading the data comprises:

driving an expansion memory address onto a first portion of a time-multiplexed address/data bus of the local bus during the expansion memory read transaction;

reading and buffering the data from the expansion memory through a second portion of the time-multiplexed address/data bus of the local bus as a read enable signal of the expansion memory is asserted; and asserting a chip enable signal of the expansion memory through the shared bus interface while reading the data;

wherein the first portion of the time-multiplexed address/data bus is connected to a plurality of memory address lines of the expansion memory correspondingly wherein the second portion of the time-multiplexed address/data bus is connected to a plurality of memory data lines of the expansion memory correspondingly wherein a fourth signal of the time-multiplexed address/data bus is coupled to the read enable signal of the expansion memory;

wherein the chip enable signal is independent of the local bus to avoid bus contention.

17. The method of claim 16 wherein the step of causing the local bus to exit from the nominal wait states is to assert the target ready signal of the PCI bus in order to complete expansion memory read transaction.

18. The method of claim 17 further comprising the step of sending the buffered data to a host system when the target ready signal is asserted.

19. A method for transferring data from or to a storage unit through a local bus during at least one nominal wait state, comprising:

receiving a command through the local bus;

determining the type of the received command;

if the received command is a read command or a write command with respect to the storage unit, then performing the steps of:

causing the local bus to enter one or more nominal wait states; and transferring the data from or to the storage unit through the local bus during the one or more nominal wait states of the local bus.

* * * * *